(12) United States Patent
Okada et al.

(10) Patent No.: US 6,732,838 B1
(45) Date of Patent: May 11, 2004

(54) POWER SUPPLY FOR AC ELEVATOR

(75) Inventors: Takao Okada, Ibaraki (JP); Yoshitomo Yoshino, Ibaraki (JP); Kazuhiro Shiode, Ibaraki (JP); Kazunori Hasegawa, Iwaki (JP); Shinichi Murakami, Iwaki (JP); Shigeru Nagashima, Iwaki (JP)

(73) Assignee: Fujitec Co., Ltd., Ibaraki (JP)

( * ) Notice: Subject to any disclaimer, the term of this patent is extended or adjusted under 35 U.S.C. 154(b) by 0 days.

(21) Appl. No.: 10/129,131
(22) PCT Filed: Nov. 15, 2000
(86) PCT No.: PCT/JP00/08061
§ 371 (c)(1),
(2), (4) Date: May 16, 2002
(87) PCT Pub. No.: WO01/37396
PCT Pub. Date: May 15, 2001

(30) Foreign Application Priority Data

| Nov. 17, 1999 | (JP) | 11-326421 |
| Nov. 18, 1999 | (JP) | 11-328323 |
| Dec. 13, 1999 | (JP) | 11-353610 |
| Dec. 24, 1999 | (JP) | 11-366719 |
| Jan. 13, 2000 | (JP) | 2000-004430 |

(51) Int. Cl.$^7$ ................................ B66B 1/06
(52) U.S. Cl. ...................... 187/290; 187/296
(58) Field of Search ............... 187/290, 293, 187/296; 307/66, 69; 318/375, 376, 440, 441, 139, 107, 108

(56) References Cited

U.S. PATENT DOCUMENTS

| 4,316,097 A | * | 2/1982 | Reynolds | 307/66 |
| 4,456,097 A | * | 6/1984 | Salihi | 187/289 |
| 4,484,664 A | * | 11/1984 | Nomura | 187/290 |
| 4,489,812 A | * | 12/1984 | Ferris | 187/290 |
| 4,503,940 A | * | 3/1985 | Watanabe | 187/290 |
| 4,506,766 A | * | 3/1985 | Watanabe | 187/290 |
| 4,516,665 A | * | 5/1985 | Watanabe | 187/296 |
| 4,548,299 A | * | 10/1985 | Nomura | 187/290 |
| 4,554,999 A | * | 11/1985 | Kamaike | 187/290 |
| 4,666,020 A | * | 5/1987 | Watanabe | 187/290 |
| 5,058,710 A | * | 10/1991 | Iwasa | 187/290 |
| 5,162,623 A | * | 11/1992 | Tachino | 187/290 |
| 5,285,029 A | * | 2/1994 | Araki | 187/290 |
| 5,341,902 A | * | 8/1994 | Ruiz, Sr. et al. | 187/251 |
| 5,680,030 A | * | 10/1997 | Kadouchi et al. | 320/15 |
| 5,780,980 A | * | 7/1998 | Naito | 318/139 |
| 5,896,948 A | * | 4/1999 | Suur-Askola et al. | 187/290 |
| 6,269,910 B1 | * | 8/2001 | Fargo et al. | 187/287 |
| 6,315,081 B1 | * | 11/2001 | Yeo | 187/290 |
| 6,415,892 B2 | * | 7/2002 | Araki et al. | 187/290 |
| 6,431,323 B2 | * | 8/2002 | Tajima et al. | 187/290 |
| 6,439,347 B2 | * | 8/2002 | Suga et al. | 187/290 |
| 6,439,348 B2 | * | 8/2002 | Tajima et al. | 187/290 |
| 6,474,447 B2 | * | 11/2002 | Tajima et al. | 187/290 |
| 6,522,099 B2 | * | 2/2003 | Tominaga et al. | 318/801 |

FOREIGN PATENT DOCUMENTS

JP 11-299275 10/1999

* cited by examiner

Primary Examiner—Jonathan Salata
(74) Attorney, Agent, or Firm—Armstrong, Kratz, Quintos, Hanson & Brooks, LLP

(57) ABSTRACT

An a.c. elevator of the invention has a commercial power source (1), an inverter (3) operable with the power from the commercial power source (1) for generating a.c. power, and an electric motor to be driven with the a.c. power generated by the inverter (3). A power source device includes a rechargeable battery (E), a power source circuit (10) for charging and discharging the battery (E), and a control circuit (9) for controlling the voltage to be input to the inverter (3) by controlling the operation of the power source circuit (10). The battery (E) is charged with regenerative power from the motor, the power generated by the battery (E) is supplied to the inverter (3).

33 Claims, 15 Drawing Sheets (a)          (b)

(a)

(b)

POWER SUPPLY FOR AC ELEVATOR

TECHNICAL FIELD

The present invention provides an a.c. elevator having a commercial power source, an inverter operable with the power from the commercial power source for generating a.c. power, and an electric motor to be driven with the a.c. power generated by the inverter. A power source device for the a.c. elevator comprises a rechargeable/dischargeable battery, a charge/discharge circuit for charging and discharging the battery, and a control circuit for controlling the voltage to be input to the inverter by according to a predetermined voltage command serving as a target value controlling the operation of the charge/discharge circuit, the battery being chargeable with regenerative power from the electric motor, the battery being operable to generate power and supply the power to the inverter.

BACKGROUND ART

As shown in FIG. 16, elevators generally have a well bucket construction which comprises a rope 83 wound on a hoist 82 and provided with an elevator car 8 connected to one end thereof and a counterweight 81 connected to the other end thereof. The weight of the counterweight is so adjusted as to be in balance with a load corresponding to 40 to 50% of the rated movable load.

With progress in power electronics devices and techniques for controlling these devices in recent years, inverter drive systems are placed into use which comprise an inverter 3 for supplying voltage-variable frequency-variable a.c. power to an induction motor of the hoist 82 as illustrated for speed control to lift and lower the elevator car 8.

When the car as fully occupied is lifted or when the car is lowered in an empty state with the elevators of the inverter drive type, there is a need to increase potential energy, so that the increase of energy is supplied from the power source 1 to the induction motor through an converter 2 and the inverter 3. Such an operating mode is termed a "load lifting operation." Conversely when the car is lifted in an empty state or is lowered as filled with passengers, the potential energy is to be decreased, and the decrease of potential energy is converted by the induction motor to electric energy (electric power) and returned to the inverter 3. This operating mode is termed a "load lowering operation," and the power to be returned to the inverter 3 is termed "regenerative power." Unless this regenerative power is treated by some method, the input voltage of the inverter will increase to break control elements.

Accordingly already known are a method of returning the regenerative power to the power source using a converter comprising transistors and adapted to regenerate the power source, and a method of dissipating into air the regenerative power as converted to heat by resistance. The former method is used chiefly for high-speed elevators in high-rise buildings, while the latter method is used for medium- to low-speed elevators in medium to low buildings.

The converter for use in the former method exhibits a high conversion efficiency, affords a power factor of nearly 1, is therefore very excellent, but has the drawback of necessitating an expensive apparatus. On the other hand, the latter method is easy to control and inexpensive in apparatus, but has the problem of being low in energy utilizing efficiency since the regenerative power is released as heat.

For use with electric motors for driving elevators, a power source device has been proposed which comprises a battery connected in parallel with a d.c. power supply unit of constant voltage and to be charged with regenerative power when the elevator motor is decelerated, such that the battery chiefly supplies current to the motor when the motor is accelerated [JP-B No. 53-4839(1978)]. With the proposed power source device, however, there must be a specific corresponding relationship between the voltage regulation characteristics of the rectifying circuit for converting the a.c. output of the power source to direct current and the voltage regulation characteristics of the battery, whereas it is difficult to design a rectifying circuit and battery which will fulfill such a corresponding relationship. Thus the proposed device has the problem of being difficult to realize.

Accordingly, an object of the present invention is to provide a power source device for a.c. elevators which achieves a high energy utilization efficiency and which is nevertheless easy to realize.

DISCLOSURE OF THE INVENTION

The present invention provides an a.c. elevator having a commercial power source, an inverter operable with the power from the commercial power source for generating a.c. power, and an electric motor to be driven with the a.c. power generated by the inverter. A power source device for the a.c. elevator comprises a rechargeable battery, a charge/discharge circuit for charging and discharging the battery, and a control circuit for controlling the voltage to be input to the inverter by controlling the operation of the charge/discharge circuit, the battery being chargeable with regenerative power from the electric motor, the battery being operable to generate power and supply the power to the inverter.

The predetermined voltage command has a value corresponding to a constant voltage higher than full-wave rectified voltage of the commercial power source. The charge/discharge circuit has a charge control element for closing a charge circuit and a discharge control element for closing a discharge circuit, and the charge control element and the discharge control element are on/off-controlled by the control circuit.

The control circuit alternately turns on the charge control element and the discharge control element to alternately charge and discharge the battery. According to the charged state of the battery or the operating state of the elevator, the control circuit alters the on period of the charge control element and the on period of the discharge control element relative to each other to determine the priority of charging by the charge circuit or discharging by the discharge circuit.

Consequently, the input voltage of the inverter is controlled to a constant level. For example during the load lowering operation, regenerative power supplied from the motor via the inverter is delivered to the battery for charging, while during the load lifting operation, the power generated by the battery is supplied to the motor via the inverter.

The control circuit comprises discharge restricting means for restricting the discharging of the battery and charge restricting means for restricting the charging of the battery. The charge restricting means of the control circuit prevents charging of the battery upon the charged state of the battery exceeding about 80% of the rated capacity thereof to thereby prevent overcharging. The discharge restricting means of the control circuit prevents discharging of the battery upon the charged state of the battery dropping below about 30% of the rated capacity thereof to thereby prevent overdischarging.

The charge restricting means and the discharge restricting means of the control circuit comprises a limiter circuit for imposing limitation on the deviation of the input voltage of the inverter from the voltage command thereof. The charge-side limiter value of the limiter circuit is set to zero upon the charged state of the battery exceeding about 80% of the rated capacity thereof. The discharge-side limiter value of the limiter circuit is set to zero upon the charged state of the battery dropping below about 30% of the rated capacity thereof.

The control circuit comprises a discharge preventing means for preventing discharging of the battery under a predetermined condition. The control circuit comprises a charge preventing means for preventing charging of the battery under a predetermined condition.

The control circuit further comprises means for presetting capacity measuring means for measuring the capacity of the battery, upon completion of charging of the battery, and means for resetting capacity measuring means for measuring the capacity of the battery, upon completion of discharging of the battery, whereby an accumulated error of the capacity measuring means is eliminated.

The control circuit comprises means for changing over discharging from the battery to constant-current control and changing over charging of the battery to constant-current control, and means for detecting the internal resistance of the battery based on the terminal voltage of the battery during discharging and the terminal voltage of the battery during charging. Accordingly, the life of the battery can be judged from the variation of the internal resistance.

The power source device of the present invention comprises an output contact provided between an input terminal of the inverter and the control circuit and controllable for opening and closing, a comparator for comparing the input voltage of the inverter with the terminal voltage of the battery, and control means for closing the output contact upon said input voltage exceeding said terminal voltage, whereby rush current is suppressed when the output contact is closed.

BEST MODE OF CARRYING OUT THE INVENTION

Figure 2:
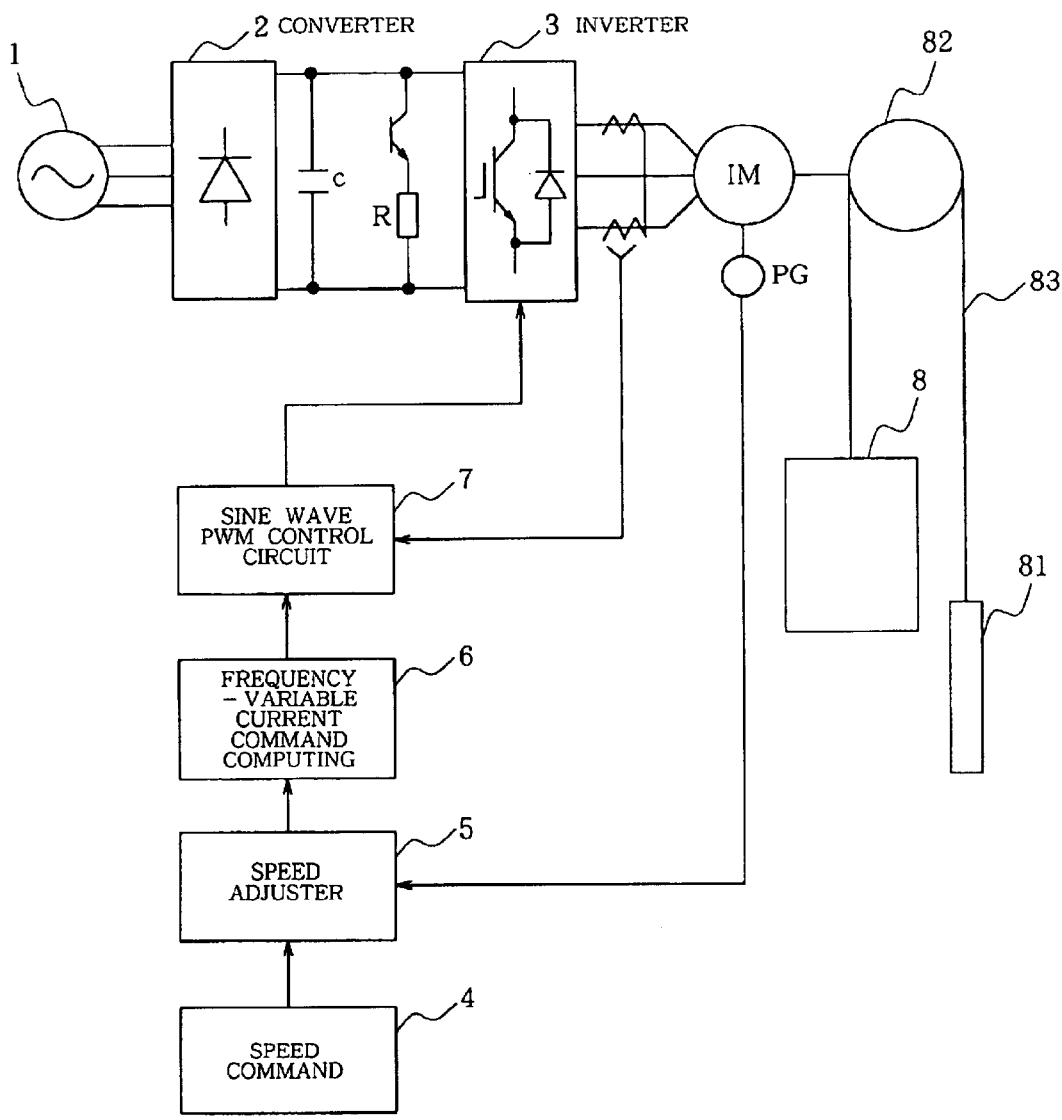
FIG. 2 is a block diagram showing an inverter and the construction of a PWM control circuit of an a.c. elevator.

The power source device of this invention for a.c. elevators will be described below in detail with reference to embodiments and to the drawings. Throughout the drawings showing the embodiments, like parts will be designated by like reference numerals and will not be described repeatedly.
First Embodiment A rope 83 is wound on a hoist 82 to be driven by an induction motor 1M as shown in FIG. 2. An elevator car 8 is connected to one end of the rope 83, and a counterweight 81 to the other end of the rope 83.

The a.c. power supplied from a commercial power source 1 is converted by a converter 2 to d.c. power, then input to an inverter 3 and converted to a.c. power. The inverter delivers an a.c. current to the induction motor 1M.

The inverter 3 is controlled by a known PWM control circuit shown in FIG. 2. Stated more specifically, the inductor motor 1M is provided with a pulse generator PG for. detecting the actual speed of the elevator car 8. A speed command 4 for the elevator car 8 and an output signal of the pulse generator PG are fed to a speed adjuster 5 to prepare a speed deviation signal, which is fed to a frequency-variable current command computing circuit 6. This circuit prepares a frequency-variable current command, which is fed to a sine wave PWM control circuit 7 for this circuit to prepare a PWM control signal. This signal is fed to the inverter 3 for the speed control of the elevator car 8.

Figure 1:
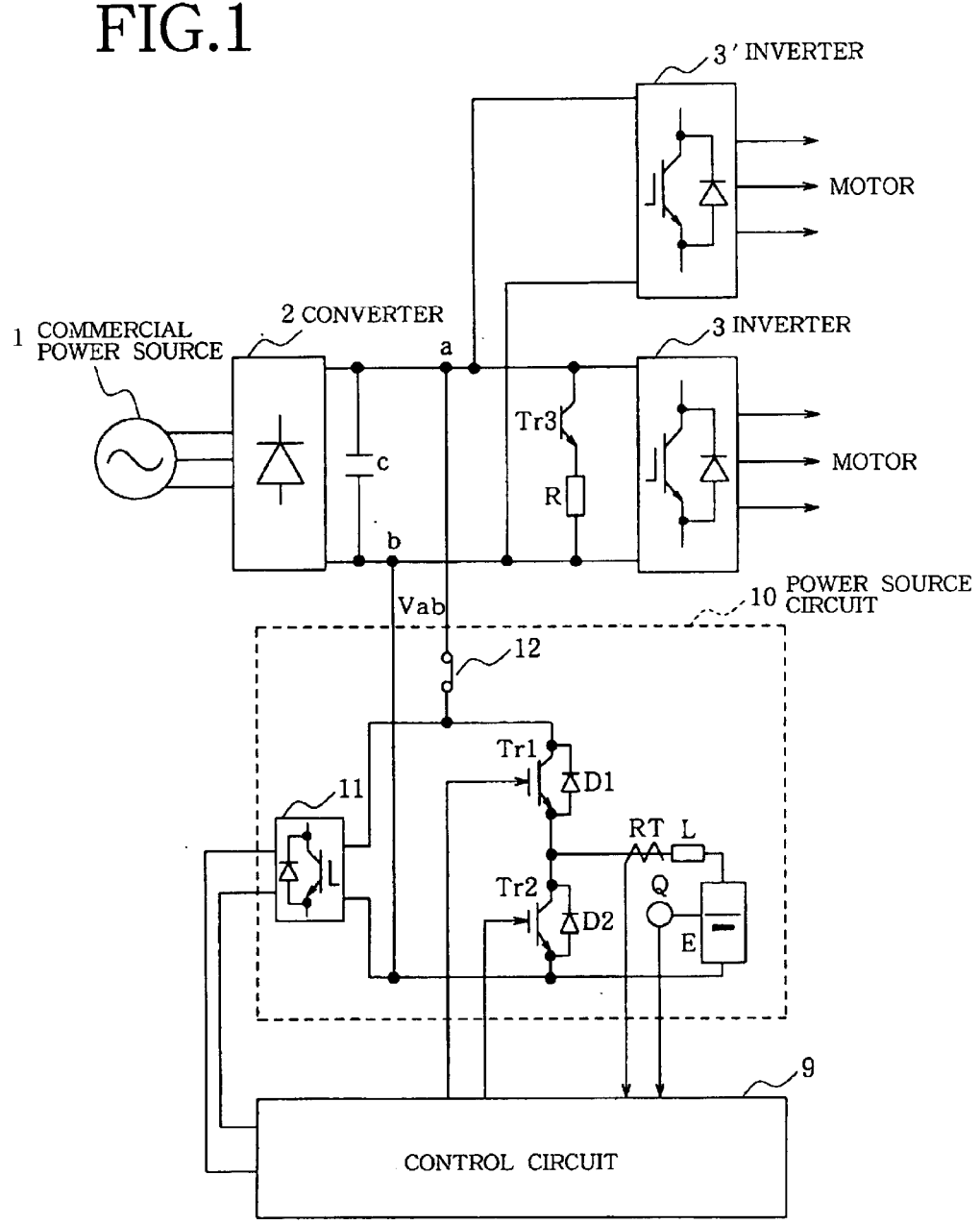
FIG. 1 is a circuit diagram showing the construction of a power source device of the present invention.
Figure 11:
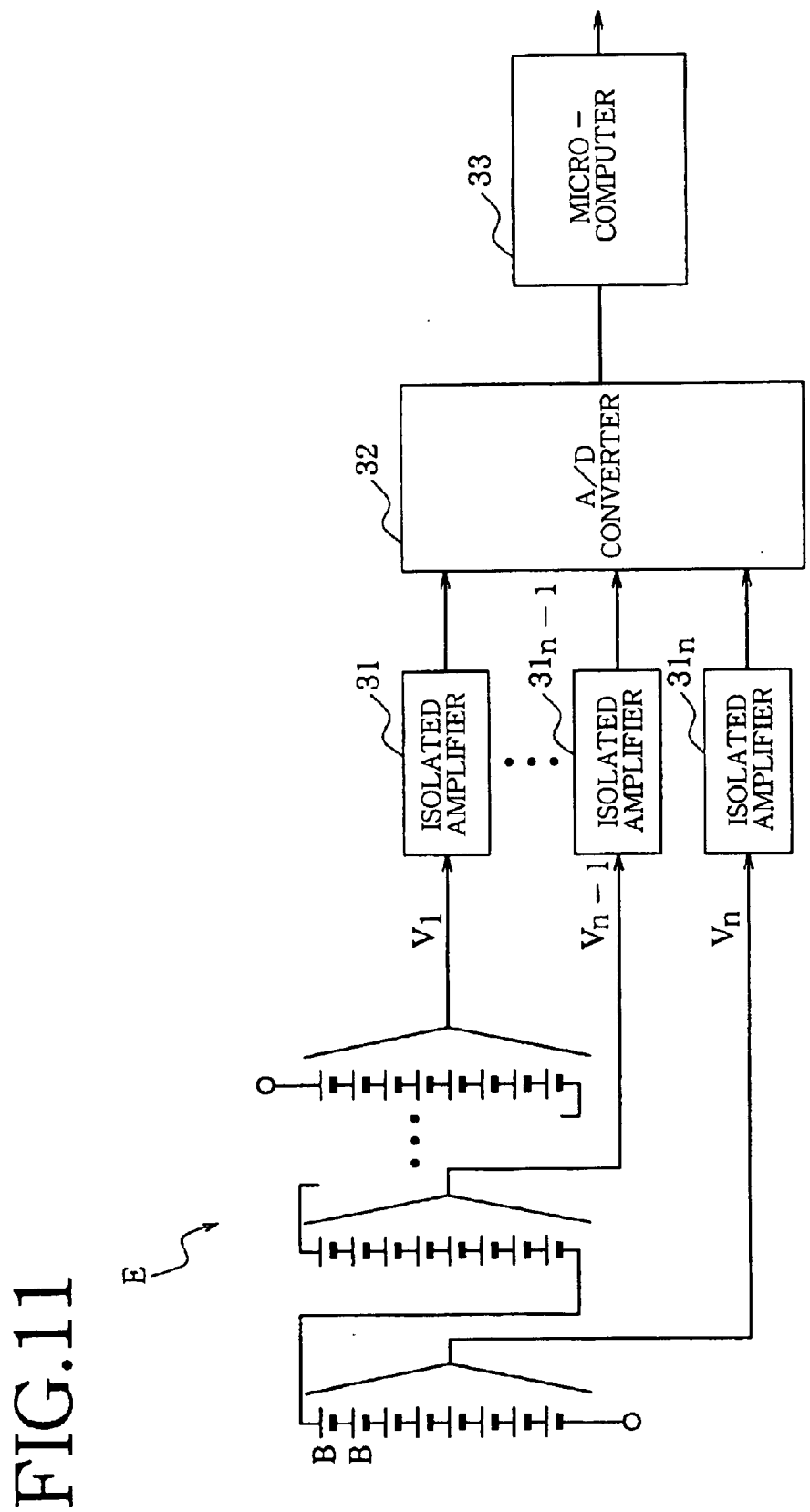
FIG. 11 is a block diagram showing an example of battery comprising a plurality of units.

As shown in FIG. 1, the inverter 3 has input terminals a, b, which have connected thereto a power source circuit 10 according to the invention. The power source circuit 10 comprises a battery E comprising secondary cells such as nickel-hydrogen cells, and a pair of transistors Tr1, Tr2 and a pair of diodes D1, D2 for controlling the charging and discharging of the battery E. For example as shown in FIG. 11, the battery E comprises a plurality of units in accordance with the capacity of the elevator, each of the units comprising eight cells B.

With reference to FIG. 1, the battery E has connected thereto a capacity meter Q for detecting the quantity of charge thereof, booster coil L and current detector RT. Although the capacity meter Q is described as being a hardware instrument connected to the battery E, the meter is, not limited to such an instrument but can be measuring means as software for calculating the capacity from variations in the current detected by the current detector RT.

Figure 7:
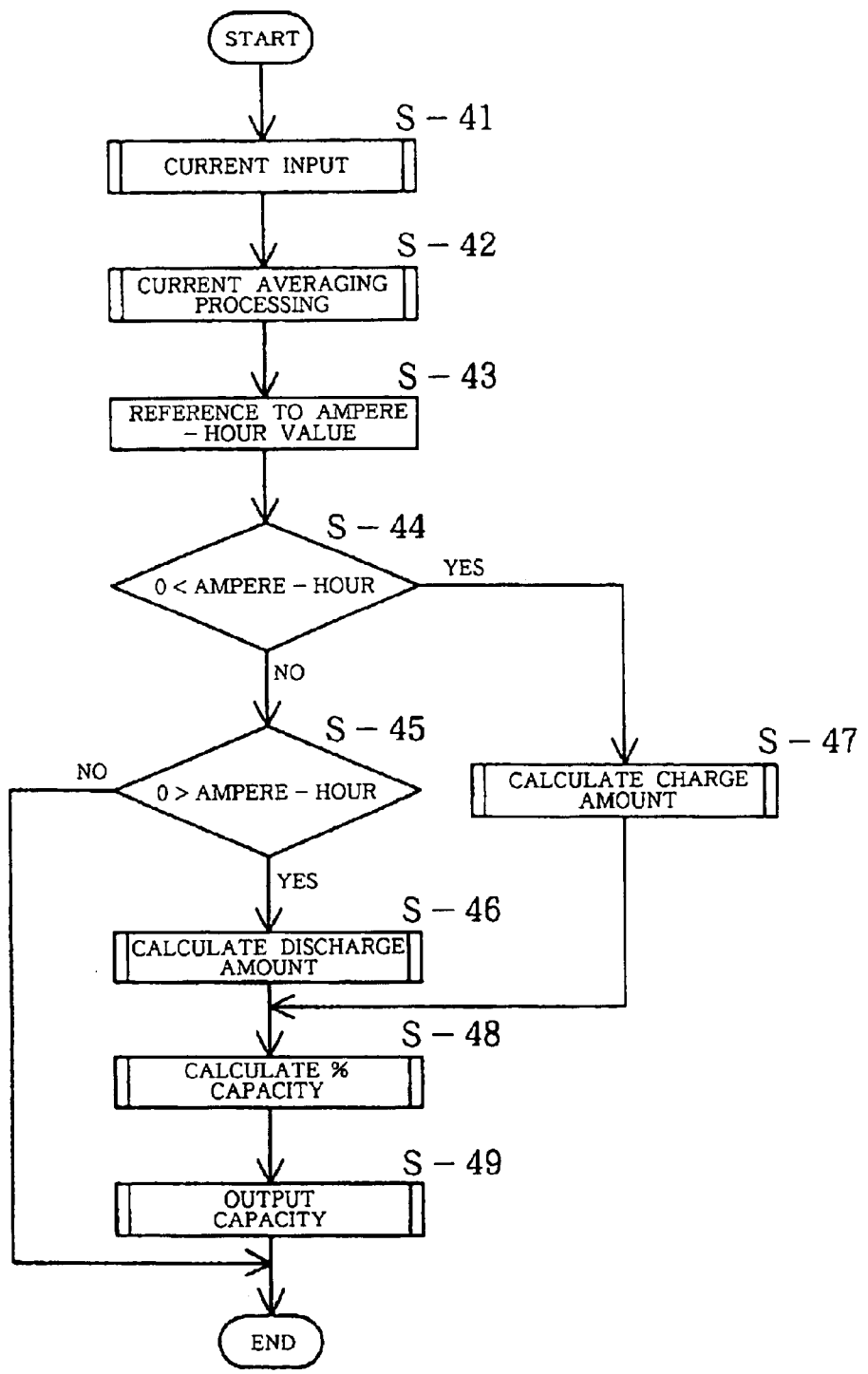
FIG. 7 is a flow chart showing an example of procedure for realizing a capacity meter by software.

FIG. 7 is a flow chart showing an example of procedure for realizing the capacity meter Q by software. First, a current input is received from the current detector RT in step S-41, and the current is processed for averaging in step S-42. Next, an ampere-hour value is referred to in step S-43, and an inquiry is made in step S-44 as to whether the ampere-hour value is above 0. If the inquiry is answered in the negative, step S-45 follows to check whether the ampere-hour value is lower than 0. If the answer is affirmative, step S-46 follows to calculate the amount of discharge. If the inquiry of step S-44 is answered in the affirmative, on the other hand, step S-47 follows to calculate the amount of charge. Subsequently step S-48 calculates the capacity in percentage from the result of calculation of the discharge amount or charge amount, and the calculated capacity is fed to a capacity memory in step S49.

Further as shown in FIG. 1, the battery E has connected thereto an emergency power source supply circuit 11 serving as a control power source for supplying the power of the battery E in an event of a power failure or like emergency, and an emergency contact 12 to be opened in the event of malfunctioning of the power source circuit 10.

Figure 3:
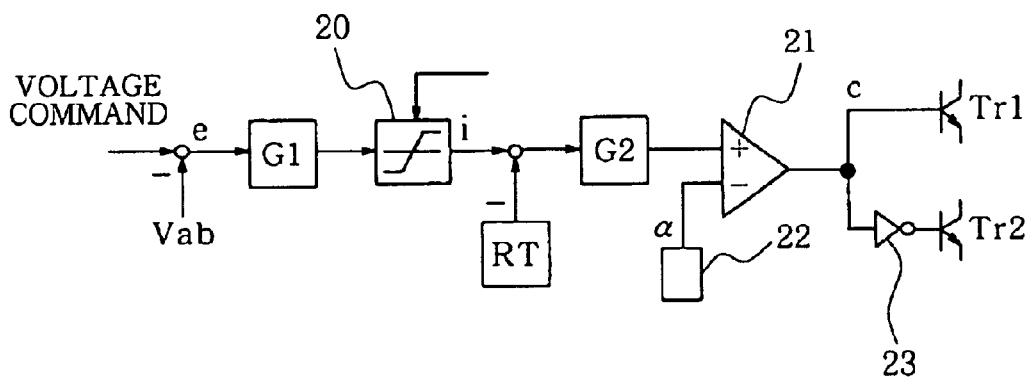
FIG. 3 is a block diagram showing the construction of a control system of the power source device of the invention.

The output signals of the current detector RT and the capacity meter Q are fed to a control circuit 9 comprising a microcomputer, and a corresponding control signal prepared is fed to the pair of transistors Tr1, Tr2 to control the input voltage Vab for the inverter 3 to a constant voltage as will be describe later. FIG. 3 shows a control system realized by the power source circuit 10 and the control circuit 9. To a predetermined voltage command, the input voltage Vab of the inverter 3 is negatively fed back, and the deviation signal e is passed through a transfer function G1 and limiter circuit 20 to prepare a current command i. A current value from the current detector RT is negatively fed back to the current command i, and the deviation signal is input to a comparator 21 via a transfer function G2.

The comparator 21 compares triangular waves a from a triangular wave generator 22 and an output signal from the transfer function G2 to prepare a control signal C for the pair of transistors Tr1, Tr2. A "not" element 23 is connected to the base of the second transistor Tr2 to make the two transistors Tr1, Tr2 different form each other in conduction period.

For example in the case where the voltage of the commercial power source 1 is 200 V, the full-wave rectified voltage obtained from the converter 2 is usually about 280 V. When the voltage command shown in FIG. 3 is set at 350 V, the control system for the power source circuit 10 effects voltage control so as to maintain the input voltage Vab of the inverter 3 at a constant voltage higher than the full-wave rectified voltage, i.e., at 350 V.

Figure 5:
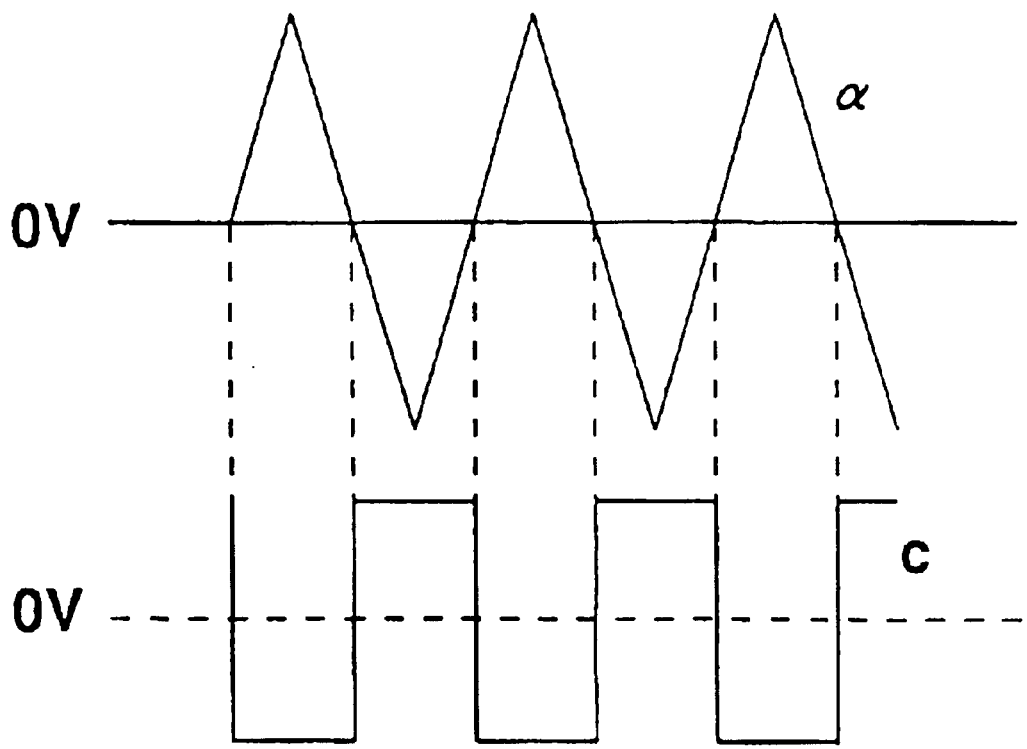
FIG. 5 is a waveform diagram of triangular waves and a control signal.

When the input voltage Vab is 350 V, the deviation signal e is zero, the current command i to be delivered from the limiter circuit 20 is also zero, and the control signal C from the comparator 21 is given a pulse waveform wherein on period is equal to off period as seen in FIG. 5. As a result, the two transistors Tr1, Tr2 repeatedly alternately conducts for the same period of time, whereby the battery E is charged and discharged alternately for the same period of time in repetition, thus acting to maintain the input voltage of the inverter 3 at 350 V.

Figure 6:
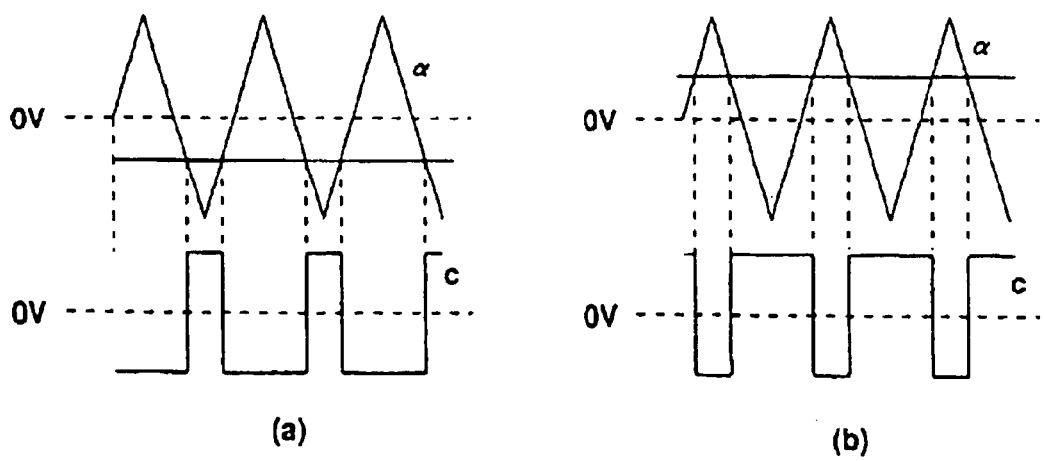
FIG. 6 includes waveform diagrams showing the same when the input voltage of the inverter is altered.

When the input voltage Vab dropped below 350 V, the control signal C delivered from the comparator 21 assumes a pulse waveform having a short on period and a long off period as seen in FIG. 6(a). Consequently, the first transistor Tr1 is shortened in on period and the second transistor Tr2 is extended in on period, making discharging of the battery E predominant over the charging thereof to raise the input voltage Vab to 350 V.

On the other hand, when the input voltage Vab exceeded 350 V, the control signal C delivered from the comparator 21 assumes a pulse waveform having a long on period and a short off period as seen in FIG. 6(b). Consequently, the second transistor Tr2 is shortened in on period and the first transistor Tr1 is extended in on period, making charging of the battery E predominant over the discharging thereof to lower the input voltage Vab to 350 V.

The usual path through which the battery E is discharged in FIG. 1 is from the battery E through the coil L, current detector RT and second transistor Tr2, and back to the battery E. The usual path through which the battery E is charged is from the inverter input terminal a, via the emergency contact 12, first transistor Tr1, current detector RT, coil L and battery E, and back to the inverter input terminal b. When the transistors Tr1, Tr2 are off, the coil L acts to instantaneously pass the charge current or discharge current of the battery E through the diode D2 or D1.

In the case where the charged state of the battery E detected by the capacity meter Q is, for example, up to 30% of the rated capacity, the discharge-side limiter value of the limiter circuit 20 shown in FIG. 3 is set at zero to effect charging only, while if the charged state of the battery E is, for example, at least 80% of the rated capacity, the charge-side limiter value of the limiter circuit 20 is set to zero to effect discharging only. This precludes overcharging or complete discharging to give an extended life to the battery.

Figure 4:
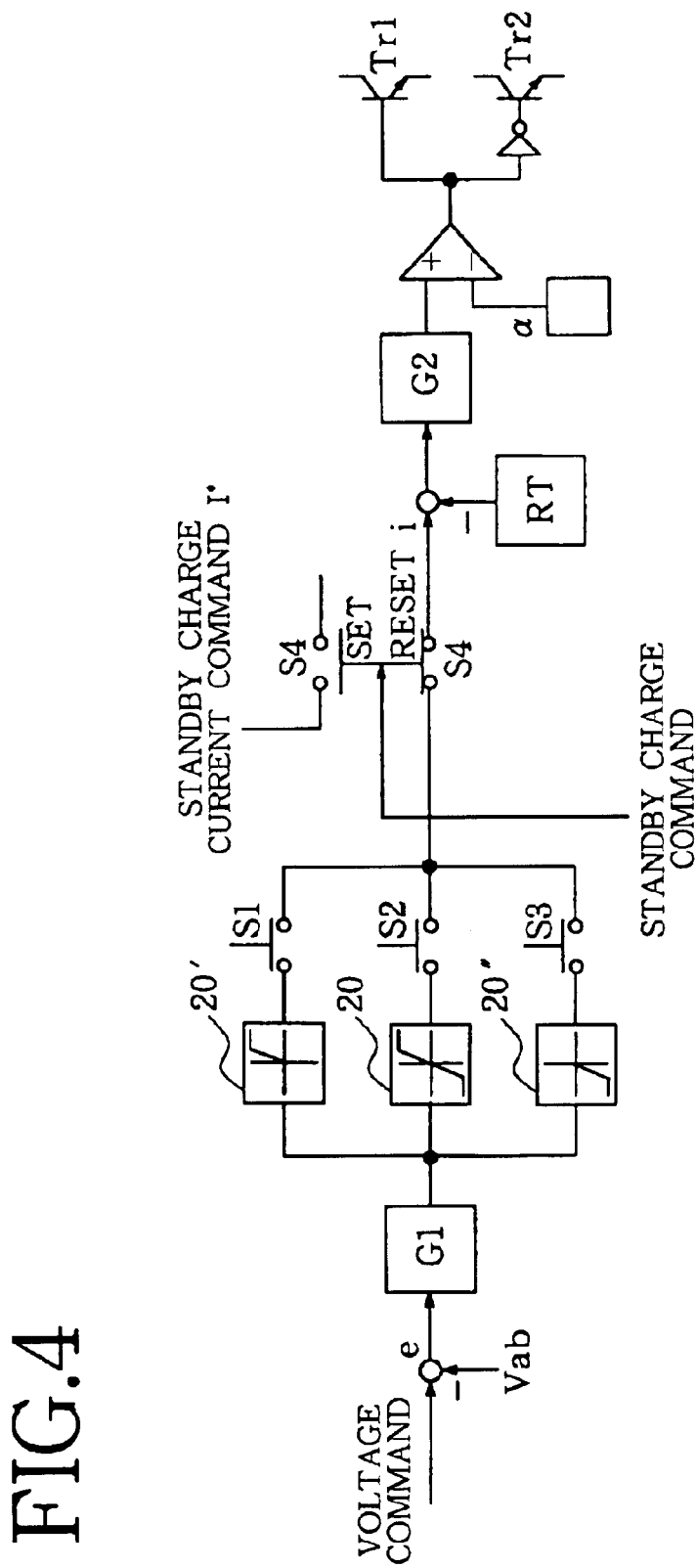
FIG. 4 is a block diagram showing different construction of like control system.
Figure 8:
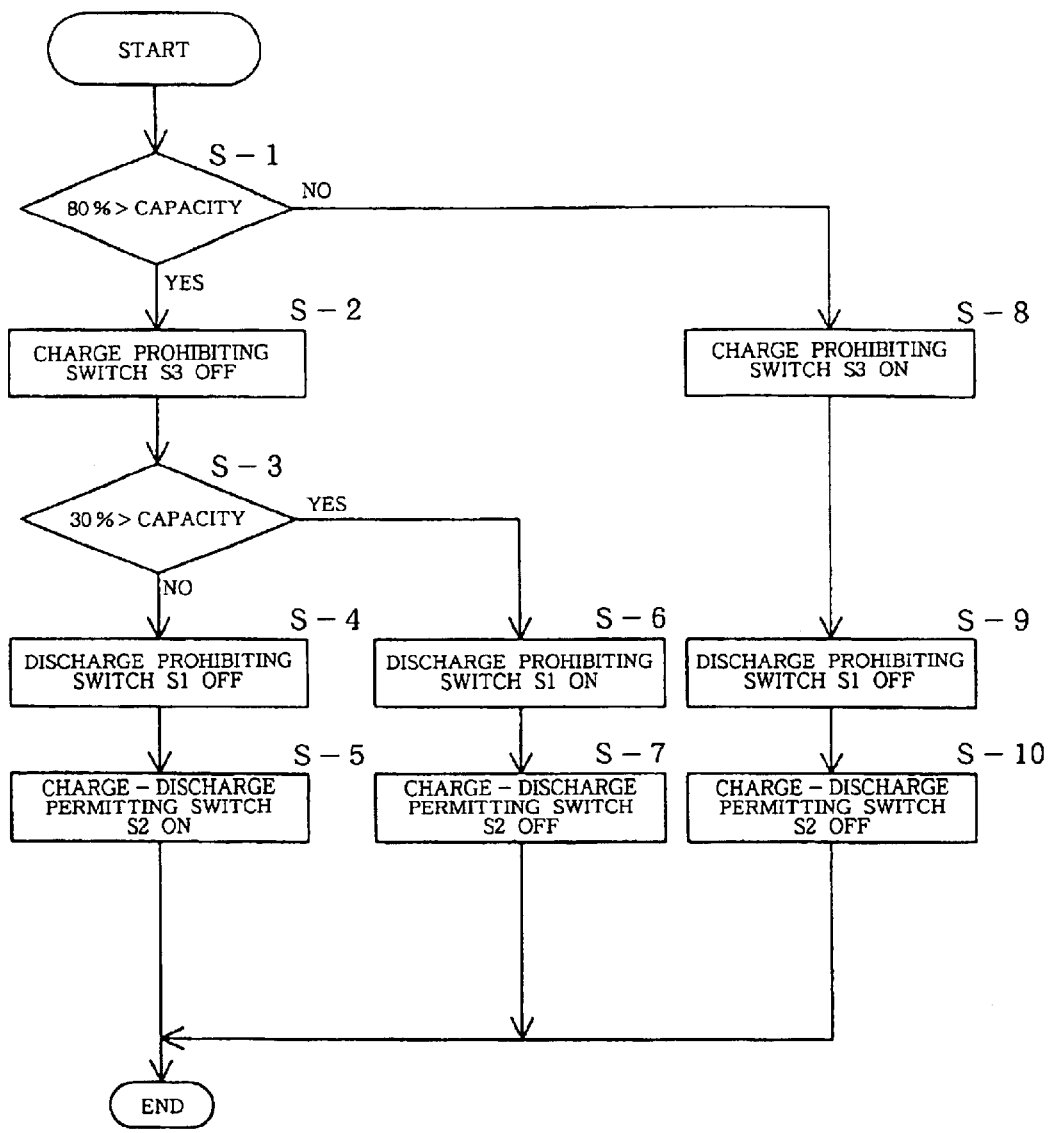
FIG. 8 is a flow chart showing an example of procedure for controlling charging and discharging.

For example as shown in FIG. 4, a limiter circuit 20' having a discharge-side limiter value of zero and a limiter circuit 20" having a charge-size limiter value of zero are connected in parallel to a limiter circuit 20 having a charge-side and a discharge-side limiter value (>zero), and discharge prohibiting switch S1, charge prohibiting switch S3 and a charge-discharge permitting switch S2 are arranged in the rear of and connected to these limiter circuits 20', 20" and 20, respectively. These switches are on/off-controlled by the procedure shown in FIG. 8.

An inquiry is made in step S-1 as to whether the capacity is below 80%, and if the answer is affirmative, the charge prohibiting switch S3 is turned off in step S-2. Next in step S-3, an inquiry is made as to whether the capacity is below 30%, and if the answer is negative, the discharge prohibiting switch S1 is turned off in step S-4, and charge-discharge permitting switch S2 is turned on in step S-5, whereby both charging and discharging are effected. On the other hand, if the answer to the inquiry of step S-3 is affirmative, the discharge prohibiting switch S1 is turned on in step S-6, and the charge-discharge permitting switch S2 is turned off in step S-7, whereby charging only is effected. Further if the inquiry of step S-1 is answered in the negative, the charge prohibiting switch S3 is turned on in step S-8, the discharge prohibiting switch S1 is thereafter turned off in step S-9, and the charge-discharge permitting switch S2 is turned off in step S-10. The battery is then discharged only.

When the elevator is at a stop, the battery is charged by the commercial power source to hold the battery charged to about 60% of the rated capacity, whereby the battery can be maintained in the best charged state, that is, the battery can be maintained in such a state as to be charged or discharged free of trouble regardless of whether the elevator is subsequently operated by regeneration or driving. If the capacity is in excess of 60%, the power of the battery may be supplied to the control circuit 9 from the emergency power source supply circuit 11.

Figure 9:
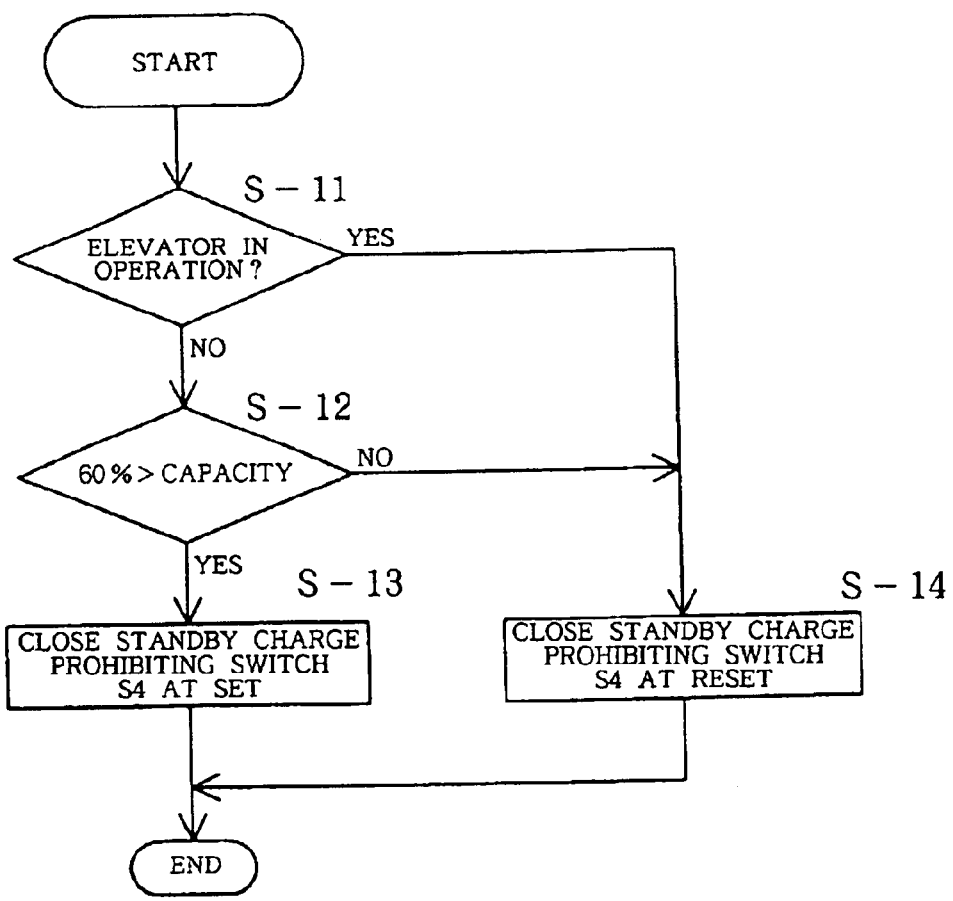
FIG. 9 is a flow chart showing an example of procedure for controlling standby charging.

For example as shown in FIG. 4, a standby charge prohibiting switch S4 to be changed over by a standby charge command is connected to the output terminal of the limiter circuit 20. The output signal of the limiter circuit 20 or a standby charge current command is selected, for example, by changing over the switch by the procedure shown in FIG. 9.

Stated more specifically, an inquiry is made in step S-11 as to whether the elevator is in operation. When the answer is negative, a further inquiry is made in step S-12 as to whether the capacity is below 60%. If the answer is affirmative, step S-13 follows to change over the standby charge prohibiting switch S4 to SET side to select the standby charge current command. If on the other hand the inquiry of step S-11 is answered in the affirmative or the inquiry of step S-12 is answered in the negative, step S-14 follows to change over the switch S4 to RESET side to select the output of the limiter 20. Consequently, the battery is charged to about 60% of the rated capacity when the elevator is at rest.

If an inverter 3' for controlling another elevator is connected in parallel to the inverter 3 as shown in FIG. 1, the power can be exchanged between power running and regenerative operation to achieve a further saving in energy.

If the input voltage Vab of the inverter 3 becomes excessively high for one cause or another, a transistor Tr3 interposed between the input terminals a, b of the inverter 3 is turned on to cause a resistor R to consume the regenerative power.

With the power source device described, the mode of handling the limiter value of the limiter circuit 20 shown in FIG. 3 can be altered not only according to the charged state of the battery E described but also according to the operating state of the elevator.

The proper amount of charge of the battery E is basically set at 60% of the rated capacity, but can be altered for weekdays or holidays or for a particular time zone. For example in the case where a continued power running operation is expected as when people are arriving at office buildings for work, the proper amount of charge of the battery E is set to a somewhat greater value, with preference for use as an auxiliary power source, whereas in the case where a continued regenerative operation is conversely expected as during the lunch time, the amount of charge of the battery E is set at a somewhat smaller value, with preference given to the regenerative operation.

Further even in the event of continued power running operation or regenerative operation, the discharge-side limiter value may be set at a value which will not greatly alter the charge amount of the battery E, e.g., a value enabling supply of about 30% of the rated power of the motor. The power to be supplied from the commercial power source can then be not greater than the remaining 70% even when the elevator is in operation with the rated load thereon. This makes it possible to greatly reduce the capacity of the power source equipment.

Further various other modes of control are usable which include charging only to be effected while the elevator is at rest.

With the power source device described, the brake for the motor 1M can be held operable by the power supply from the battery even when a power failure occurs during the operation of the elevator, enabling the elevator to come to a halt at the nearest floor with safety even in the event of a power failure.

Although the present embodiment is adapted for use with elevators of the well bucket type, the embodiment is usable also for other elevators, for example, those of the type which carries a battery as a counterweight and wherein the sheave on the counterweight side is driven directly.

Figure 17:
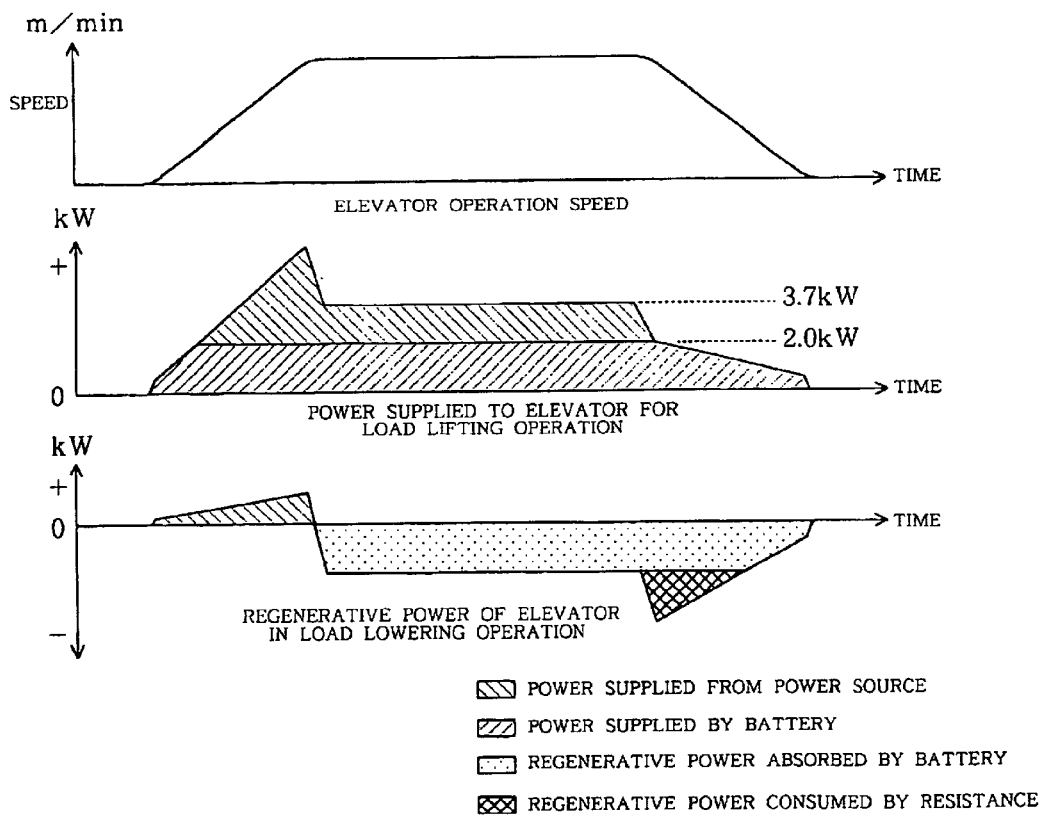
FIG. 17 includes graphs showing variations in electric power during the load lifting operation and load lowering operation of an elevator.

According to the present invention, the power source device described needs only to be added to a conventional elevator, whereby regenerative power can be obtained suitably as shown in FIG. 17 to replenish the drive power during the usual operation of the elevator even if the load involves great variations. Accordingly, a great power source equipment need not be pre-set, making it possible to greatly reduce the capacity of the power source equipment.

The recovery of regenerative power ensures effective use of energy to achieve an improved efficiency. In the case of an elevator which is 600 kg in rated load capacity and 60 mm/min in operation speed, the saving of power to be achieved per year can be about 1000 KWh. This value corresponds to about 20% of the total amount of power to be consumed by this elevator.

Furthermore, the battery comprises nickel-hydrogen cells which are free from harmful substances and are presently considered to be optimal, and is therefore unlikely to entail environmental problems.

Second Embodiment

Basically, this embodiment has the same construction as the first embodiment, and is further so constructed that the capacity meter is preset or reset by holding the battery charged or discharged under a predetermined condition.

With reference to the control system shown in FIG. 4, a state wherein the charge-discharge permitting switch S2 is on and the discharge prohibiting switch S1 is off is changed over to a state wherein the charge-discharge permitting switch S2 is off and the discharge prohibiting switch S1 is on for a predetermined period, for example, every other hour, with the charge prohibiting switch S3 off, and the discharge-side limiter value is set to zero to hold the battery E charged (charging mode). The charging mode can be set while the elevator is at rest.

As a result, the battery E is charged up completely until the voltage across the terminals of the battery E becomes sufficiently high, for example, until a voltage is reached at which the battery internally starts to evolve a gas. At this time, the capacity meter Q is preset at 100%. This eliminates the accumulated error of the meter.

The capacity meter can be reset by the discharge mode of the battery. In the control system shown in FIG. 4 in this case, a state wherein the charge-discharge permitting switch S2 is on and the charge prohibiting switch S3 is off is changed over to a state wherein the charge-discharge permitting switch S2 is off and the charge prohibiting switch S3 is on for a predetermined period, for example, every other hour, with the discharge prohibiting switch S1 off, and the charge-side limiter value is set to zero to hold the battery E discharged (discharging mode).

Consequently, the battery E is discharged fully until the voltage across the terminals of the battery E becomes sufficiently low, e.g., until the voltage drops to not higher than about ⅓ of the rated voltage. At this time, the capacity meter Q is reset to 0%. This eliminates the accumulated error of the meter.

Figure 10:
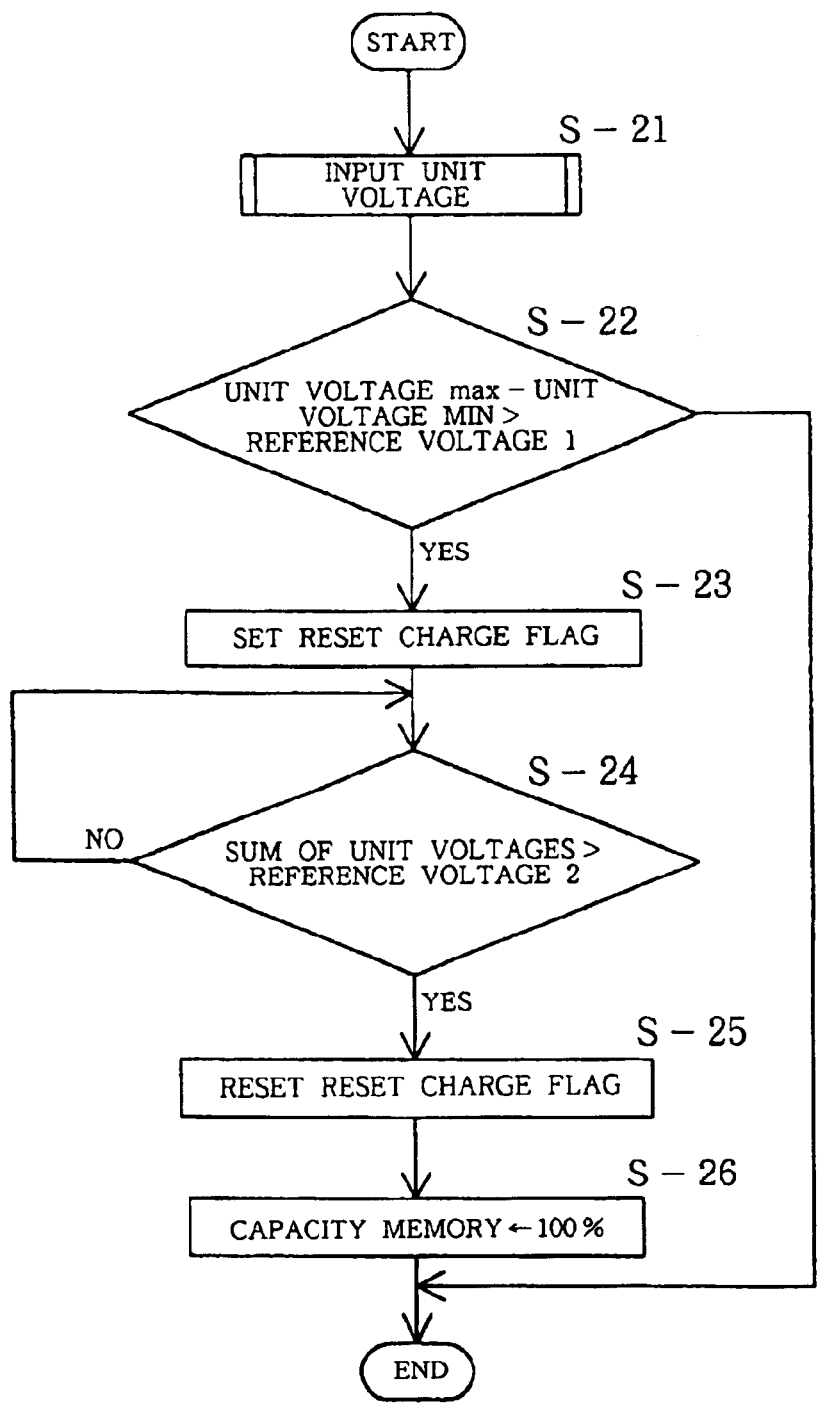
FIG. 10 is a flow chart showing an example of procedure for presetting (resetting) a capacity meter.

FIG. 10 shows an example of procedure for presetting the capacity meter by holding the battery charged. First in step S-21, the unit voltages are input, and an inquiry is made in step S-22 as to whether the difference between a maximum value max of the unit voltages and a minimum value min thereof is in excess of a reference voltage 1. When the answer is affirmative, step S-23 follows to set a reset charge flag, whereby charging of the battery is started. Subsequently, an inquiry is made in step S-24 as to whether the total sum of the unit voltages is in excess of a reference voltage 2. If the battery is completely charged up, giving an affirmative answer to the inquiry, step S-25 follows to reset the reset charge flag, whereby charging of the battery is completed. In step S-26, "100%" is stored in the capacity memory of the capacity meter to preset the capacity meter.

According to the embodiment described, the elevator is operated in the usual manner based on the measurements of the capacity meter, while regenerative power is absorbed suitably and the drive power is replenished, with errors of the capacity meter corrected suitably. Thus, the power source device of the invention exhibits the advantages thereof to the full extent.

Third Embodiment

Basically, this embodiment has the same construction as the first embodiment, and is further so constructed that variations in the amounts of charges of the cells constituting the battery are eliminated by holding the battery charged or discharged under a predetermined condition.

According to the present embodiment, the battery E comprises a plurality of units each comprising eight cells B as shown in FIG. 11. The embodiment comprises isolated amplifiers 31 to 31n for detecting voltages V1 to Vn across the terminals of the respective units, an A/D converter 32 for converting output signals from the amplifiers to digital signals, and a microcomputer 33 for on/off controlling the switches S1 to S3 shown in FIG. 4 based on the voltage values V1 to Vn obtained from the A/D converter 32. The microcomputer 33 monitors the voltage values V1 to Vn, and changes over a state wherein the charge-discharge permitting switch S2 is on, and the discharge prohibiting switch S1 and the charge prohibiting switch S3 are off (the switches being shown in FIG. 4) to a state wherein the charge-discharge permitting switch S2 is off, the discharge prohibiting switch S1 is on and the charge prohibiting switch S3 are off, when variations (e.g., about 0.4 V) in excess of a threshold value occurred in the voltage values (e.g. about 9.6 V), whereby a charging mode is set wherein charging only is effected.

Consequently, all the cells constituting the battery E are completely charged up until the terminal voltage of each cell becomes sufficiently high to eliminate variations in the charge amount of each cell. When the capacity meter Q is preset at this time as in the second embodiment, the accumulated error of the meter Q can be eliminated.

Incidentally, when variations occurred in the voltage values V1 to Vn, a discharging mode is set by changing over to a state wherein the charge-discharge permitting switch S2 and the discharge prohibiting switch S1 are off and the charge prohibiting switch S3 are on, and the elevator is held in operation until the terminal voltages of the cells or units become sufficiently low, for example, until the cell voltage drops below about 1/3 of the rated voltage of the cell, to completely discharge each cell and to thereby eliminate the variation in the charge amount of each cell. When the capacity meter Q is reset at this time as in the second embodiment, the accumulated error of the meter Q can be eliminated.

According to the present embodiment, the elevator is operated in the usual manner, while regenerative power is absorbed suitably and the drive power is replenished. If variations occurred in the charge amounts of cells or units constituting the battery, the charge amounts can be made uniform, consequently enabling the power source device of the invention to exhibit the advantages thereof to the full extent. The accumulated error of the capacity meter can also be eliminated.

Fourth Embodiment

This embodiment basically has the same construction as the first embodiment and is further so constructed as to judge the life of the battery based on an increase in the internal resistance of the battery.

Figure 12:
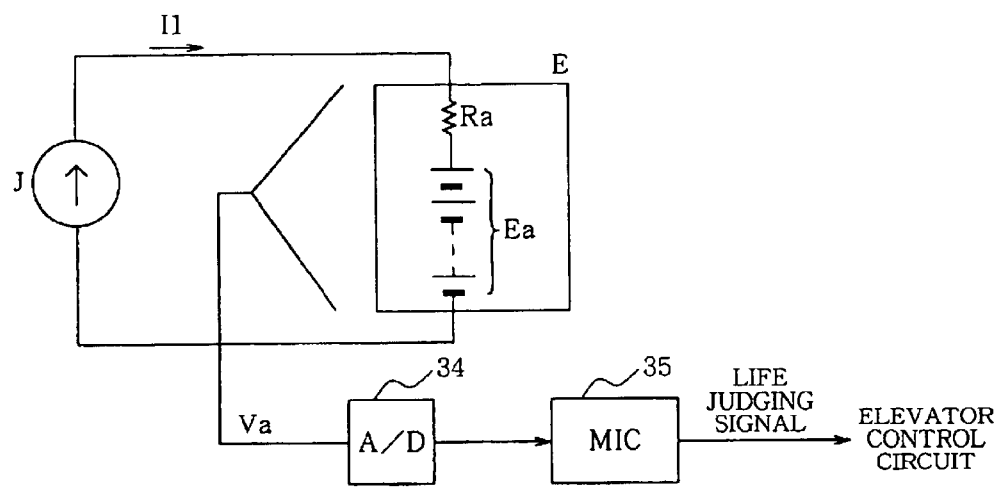
FIG. 12 includes block diagrams showing an example of construction for judging the life of the batteries.
Figure 12:
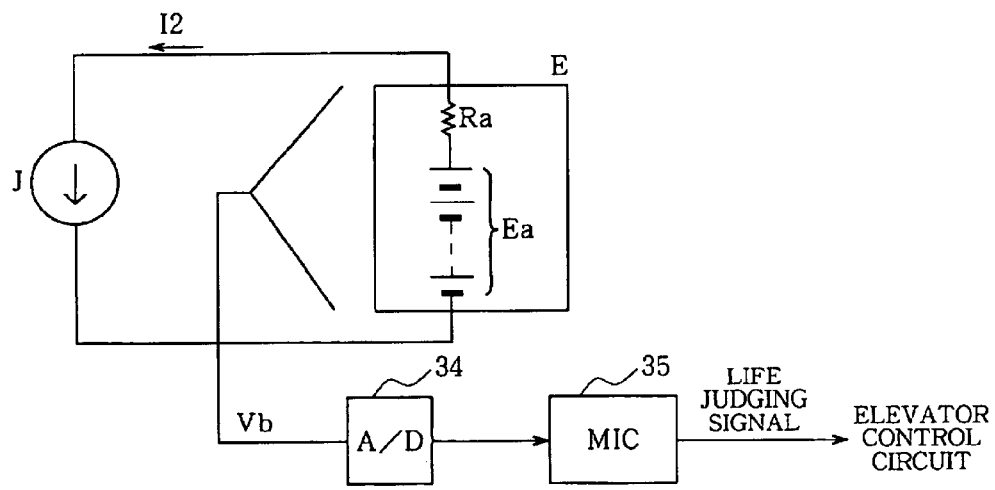

According to the present embodiment, the terminal voltage (Va or Vb) of the battery E is fed via an A/D converter 34 to a microcomputer 35, which prepares a life judging signal as shown in FIGS. 12, (a) and (b). The signal is fed to the control circuit of the elevator. With reference to the drawings, indicated at Ea is the voltage to be produced by the battery E, at Ra the internal resistance of the battery E, and at J a constant-current source for passing a constant current I1 or I2. The currents I1 and I2 have the same magnitude but flow in opposite directions.

Further with reference to. FIG. 4, the output terminal of the limiter circuit 20 has connected thereto a standby charge prohibiting switch S4 to be changed over for the usual operation or battery life judgement. When the switch is changed over, the output signal of the limiter circuit 20 is selected for the usual operation, or a standby charge current command I* is selected for passing a constant current through the battery E when the life of the battery E is to be judged.

Derived from FIGS. 12, (a) and (b) are the following Mathematical Expressions 1 and 2. Subtraction of Expression 2 from Expression 1 affords Mathematical Expression 3 upon simplification.

$$Va = Ea + I1 \times Ra \quad \text{(Mathematical Expression 1)}$$

$$Vb = Ea - I2 \times Ra \quad \text{(Mathematical Expression 2)}$$

$$Ra = (Va - Vb)2I^* \quad \text{(Mathematical Expression 3)}$$

Accordingly, the internal resistance Ra of the battery E can be determined by measuring the terminal voltage Va of the battery E during charging and the terminal voltage Vb thereof during discharging. Further a comparison between the internal resistance in the initial state and the internal resistance at present indicates the state of deterioration of the battery E. If the battery E has deteriorated seriously, namely, if the internal resistance of the battery E is in excess of a predetermined value, the battery is replaced by a new one.

Figure 13:
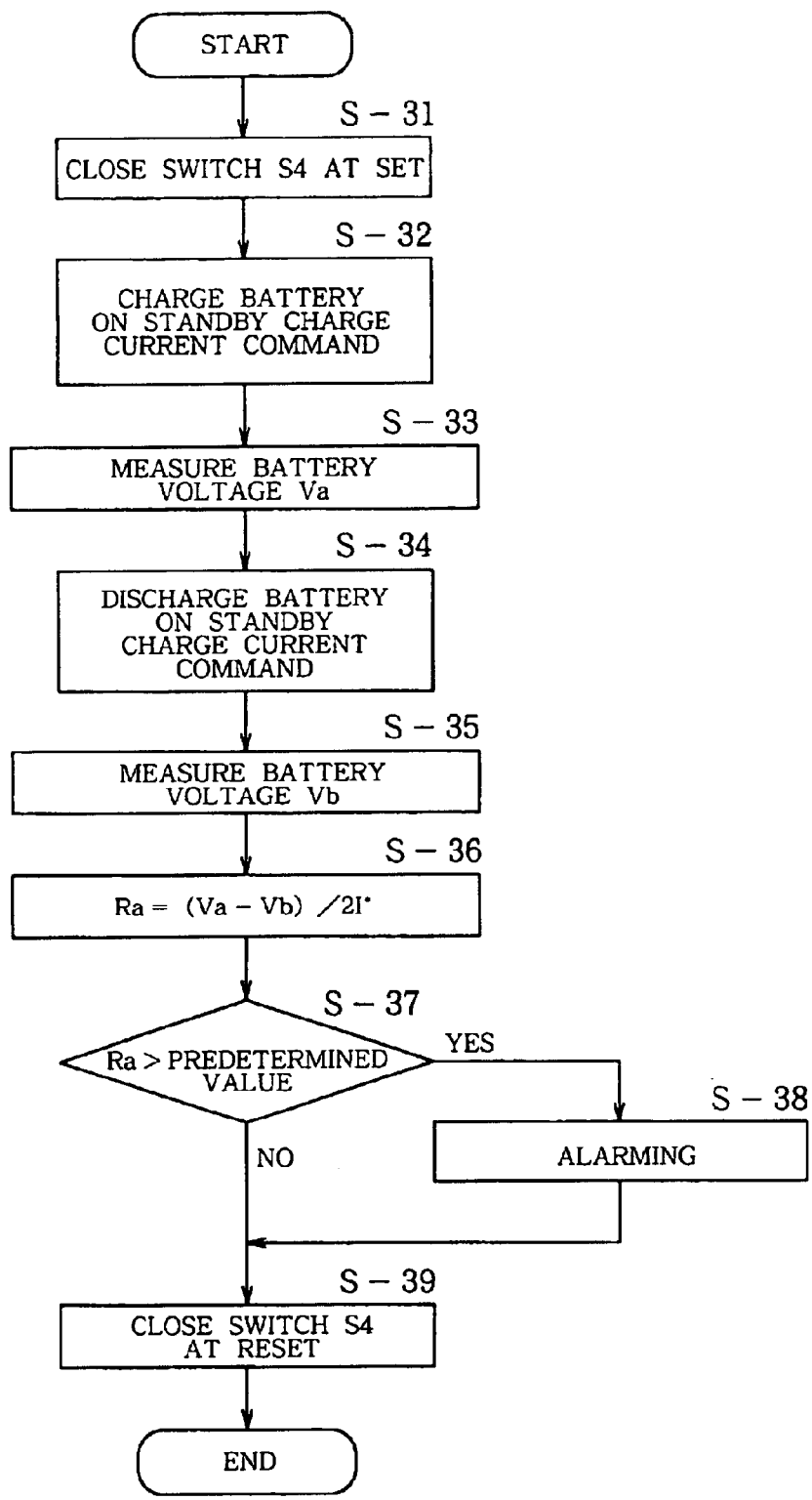
FIG. 13 is a flow chart showing an example of procedure for judging the life of the battery.

FIG. 13 shows an example of procedure for judging the life of the battery. First in step S-31, the standby charge prohibiting switch S4 is changed over to SET side, the battery is charged in response to a standby charge current command in step S-32, and the battery voltage Va is measured in step S-33. Subsequently in step S-34, the battery is discharged in response to a standby charge current command, and the battery voltage Vb is then measured in step S-35. The internal resistance Ra is thereafter calculated from Mathematical Expression 3 in step S-36. An inquiry is made in step S-37 as to whether the internal resistance Ra is in excess of a predetermined value. When the answer is affirmative, an alarm is given in step S-38. The switch S4 is closed at RESET side finally in step S-39 to complete the procedure.

According to the procedure described, the battery is replaced in response to the alarm. This ensures a high energy efficiency at all times.

In the case where the battery E comprises a plurality of units which are connected in series with one another as shown in FIG. 11, with each of the units comprising eight cells B, the terminal voltage of each unit is checked. This achieves improved accuracy in judging the battery life.

The life is judged by the above procedure preferably after eliminating the variations in the charge amounts of the cells.

Fifth Embodiment

This embodiment has basically the same construction as the first embodiment and is so constructed as to suppress rush current by a simple circuit.

Figure 14:
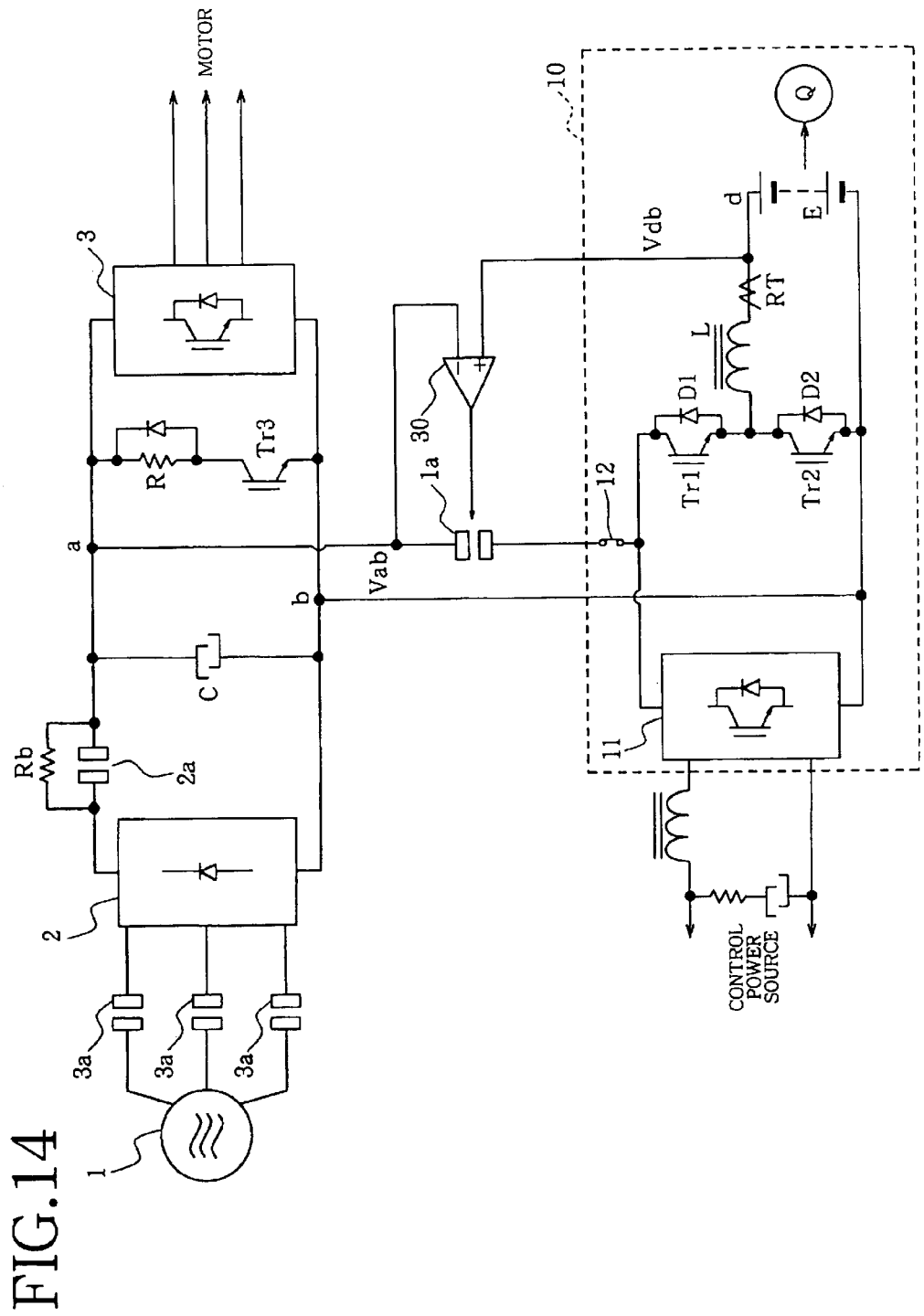
FIG. 14 is a block diagram showing a circuit for suppressing rush current.

According to the present embodiment, contacts 3a connected to the output terminals of the commercial power source 1 are closed to supply power from the converter 2 to the inverter 3, and a capacitor C is charged through a resistor Rb as shown in FIG. 14. Upon the voltage across the capacitor C reaching a predetermined value, a contact 2a of a second contact device is closed to short-circuit the resistor Rb to complete preparation for the operation of the elevator.

Interposed between an output terminal a of the inverter 3 and the power source circuit 10 is an output contact 1a to be closed when the voltage Vab across the capacitor C is lower than the voltage of the battery E. The voltage Vab at the output terminal a of the inverter 3 and the voltage Vdb at a terminal d of the battery E are fed to a comparator 30. When Vab≧Vdb, the comparator delivers a high signal, which closes the output contact 1a of the power source device 10.

Since the output contact 1a is thus closed when the input voltage Vab of the inverter 3 becomes higher than the voltage Vdb of the battery E, rush current is suppressed which flows from the battery E to charge the capacitor C through the diode D1. This obviates the likelihood that the diode D1 will be broken by a great rush current.

Figure 15:
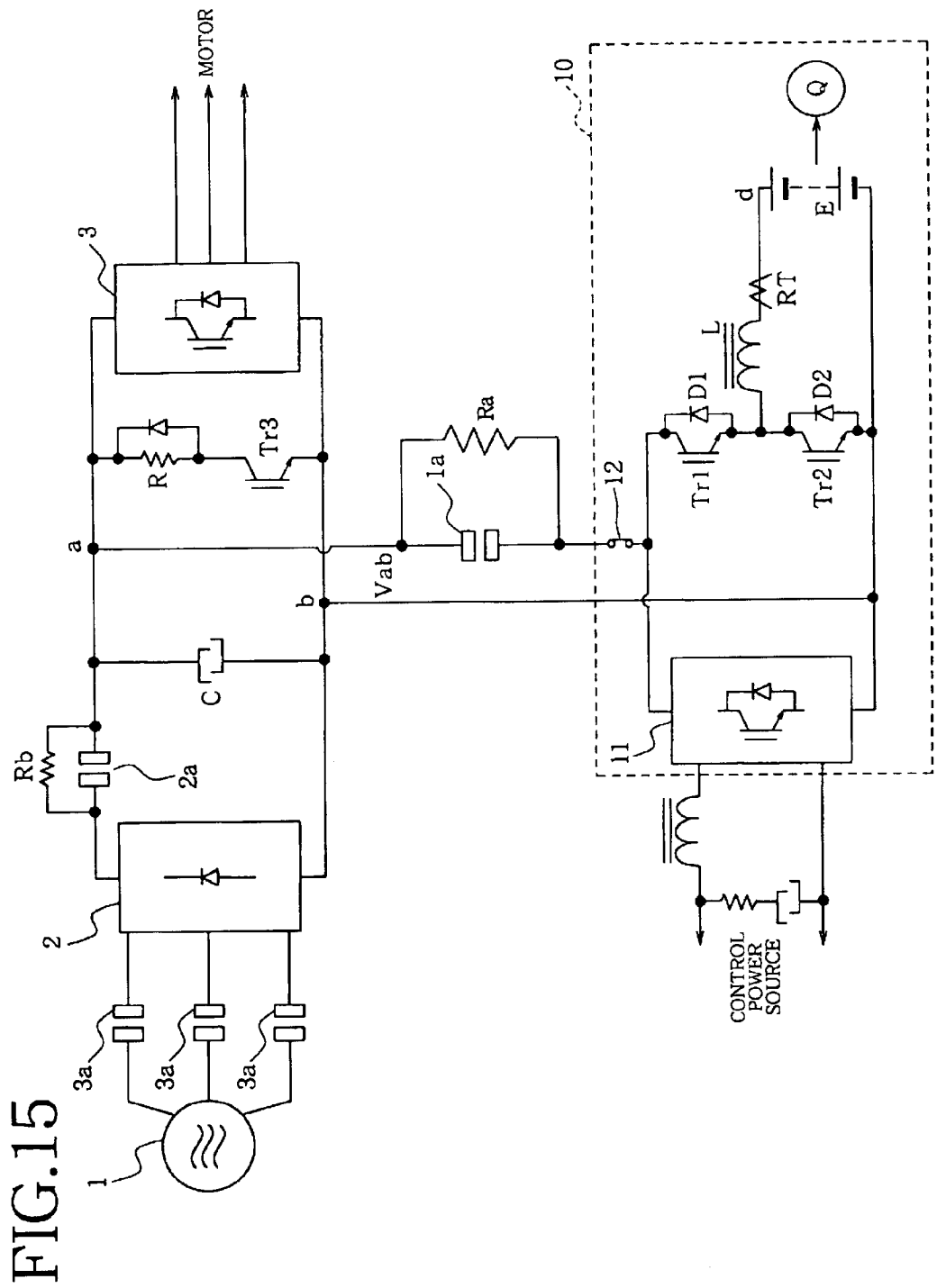
FIG. 15 is a block diagram showing another circuit for suppressing rush current.
Figure 16:
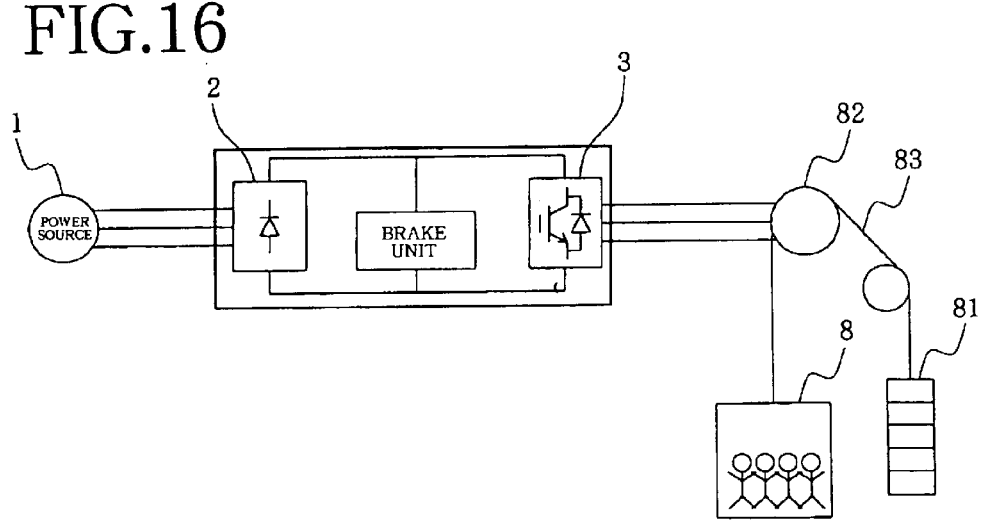
FIG. 16 is a block diagram showing the construction of an elevator of the inverter type.

FIG. 15 shows an arrangement wherein the capacitor c is charged in advance through a resistor Ra which is connected in parallel to the output contact 1a, and the output contact 1a is then closed, whereby the rush current can also be suppressed.

What is claimed is:

1. In an a.c. elevator having a commercial power source, an inverter operable with the power from the commercial power source for generating a.c. power, and an electric motor to be driven with the a.c. power generated by the inverter,
    a power source device for the a.c. elevator characterized in that the power source device comprises a rechargeable/dischargeable battery, a charge/discharge circuit for charging and discharging the battery, and a control circuit for controlling the voltage to be input to the inverter according to a predetermined voltage command serving as a target value by controlling the operation of the charge/discharge circuit, the battery being chargeable with regenerative power from the electric motor, the battery being operable to generate power and supply the power to the inverter;
    wherein the predetermined voltage command has a value corresponding to a constant voltage higher than full-wave rectified voltage of the commercial power source.

2. The power source device for an a.c. elevator according to claim 1 wherein the battery comprises a plurality of units in combination, each of the units comprising a plurality of cells.

3. The power source device for an a.c. elevator according to claim 2 wherein each of the cells comprises a nickel-hydrogen cell.

4. The power source device for an a.c. elevator according to claim 2 wherein the control circuit comprises discharge preventing means for preventing discharging of the battery, and the discharge preventing means is operated upon a variation in excess of a threshold value occurring in the amount of charge of each unit or each of the cells.

5. The power source device for an a.c. elevator according to claim 2 wherein the control circuit comprises charge preventing means for preventing charging of the battery, and the charge preventing means is operated upon a variation in excess of a threshold value occurring in the amount of charge of each unit or each of the cells.

6. The power source device for an a.c. elevator according to claim 1 wherein the control circuit determines the priority of charging or discharging by the charge/discharge circuit relative to each other.

7. The power source device for an ac. elevator according to claim 1 wherein the charge/discharge circuit has a charge control element for closing a charge circuit and a discharge control element for closing a discharge circuit, and the charge control element and the discharge control element are on/off-controlled by the control circuit.

8. The power source device for an a.c. elevator according to claim 7, wherein the charge/discharge circuit alternately charges and discharges the battery.

9. The power source device for an a.c. elevator according to claim 1 wherein the control circuit alternately turns on the charge control element and the discharge control element to alternately charge and discharge the battery.

10. The power source device for an a.c. elevator according to claim 9 wherein the control circuit alters the on period of the charge control element and the on period of the discharge control element relative to each other to determine the priority of charging by the charge circuit or discharging by the discharge circuit.

11. The power source device for an a.c. elevator according to claim 10 wherein the control circuit determines the priority of charging or discharging according to the charged state of the battery.

12. The power source device for an a.c. elevator according to claim 10 wherein the control circuit determines the priority of charging or discharging according to the operating state of the elevator.

13. The power source device for an a.c. elevator according to claim 1 wherein the control circuit comprises charge amount control means for maintaining the amount of charge of the battery at an appropriate value.

14. The power source device for an a.c. elevator according to claim 13 wherein the appropriate amount of charge of the battery is about 60% of the rated capacity of the battery.

15. The power source device for an a.c. elevator according to claim 13 wherein the appropriate amount of charge of the battery is an amount of electric power capable of supplying about 30% of the rated power of the electric motor.

16. The power source device for an a.c. elevator according to claim 1 wherein the control circuit comprises discharge restricting means for restricting 5 the discharging of the battery and charge restricting means for restricting the charging of the battery.

17. The power source device for an a.c. elevator according to claim 16 wherein the charge restricting means of the control circuit prevents charging of the battery upon the charged state of the battery exceeding about 80% of the rated capacity thereof to thereby prevent overcharging.

18. The power source device for an a.c. elevator according to claim 16 wherein the discharge restricting means of the control circuit prevents discharging of the battery upon the charged state of the battery dropping below about 30% of the rated capacity thereof to thereby prevent over discharging.

19. The power source device for an a.c. elevator according to claim 16 wherein the discharge restricting means of the control circuit prevents the discharging of the battery while the elevator is held out of operation.

20. The power source device for an a.c. elevator according to claim 16 wherein the charge restricting means and the discharge restricting means of the control circuit comprises a limiter circuit for imposing limitation on the deviation of the input voltage of the inverter from the voltage command thereof.

21. The power source device for an a.c. elevator according to claim 20 wherein the charge-side limiter value of the limiter circuit is set to zero upon the charged state of the battery exceeding about 80% of the rated capacity thereof.

22. The power source device for an a.c. elevator according to claim 20 wherein the discharge-side limiter value of the limiter circuit is set to zero upon the charged state of the battery dropping below about 30% of the rated capacity thereof.

23. The power source device for an a.c. elevator according to claim 20 wherein the discharge-side limiter value of the limiter circuit is set to zero while the elevator is held out of operation.

24. The power source device for an a.c. elevator according to claim 1 wherein the control circuit comprises a discharge preventing means for preventing discharging of the battery under a predetermined condition.

25. The power source device for an a.c. elevator according to claim 1 wherein the control circuit comprises a charge preventing means for preventing charging of the battery under a predetermined condition.

26. The power source device for an a.c. elevator according to claim 24 wherein a given time interval is set as the predetermined condition.

27. The power source device for an a.c. elevator according to claim 24 wherein a predetermined period is set as the predetermined condition.

28. The power source device for an a.c. elevator according to claim 24 wherein a specified day of the week or a specified time zone is set as the predetermined condition.

29. The power source device for an a.c. elevator according to claim 24 wherein the state of the elevator as held out of operation is set as the predetermined condition.

30. The power source device for an a.c. elevator according to claim 24 wherein the control circuit comprises means for presetting capacity measuring means for measuring the capacity of the battery, upon completion of charging of the battery.

31. The power source device for an a.c. elevator according to claim 25 wherein the control circuit comprises means for resetting capacity measuring means for measuring the capacity of the battery, upon completion of discharging of the battery.

32. The power source device for an a.c. elevator according to claim 1 wherein the control circuit comprises means for changing over discharging from the battery to constant-current control while changing overcharging of the battery to constant-current control, and means for detecting the internal resistance of the battery based on the terminal voltage of the battery during discharging and the terminal voltage of the battery during charging to judge the life of the battery from the variation of the internal resistance.

33. The power source device for an a.c. elevator according to claim 1 which comprises an output contact provided between an input terminal of the inverter and the control circuit and controllable for opening and closing, a comparator for comparing the input voltage of the inverter with the terminal voltage of the battery, and control means for closing the output contact upon said input voltage exceeding said terminal voltage.

* * * * *

UNITED STATES PATENT AND TRADEMARK OFFICE
CERTIFICATE OF CORRECTION

PATENT NO.    : 6,732,838 B1
DATED         : May 11, 2004
INVENTOR(S)   : Okada et al.

It is certified that error appears in the above-identified patent and that said Letters Patent is hereby corrected as shown below:

Title page,
Item [54], Title, change "POWER SUPPLY FOR AC ELEVATOR" to be -- AN ELEVATOR HAVING A COMMERCIAL POWER SOURCE AND AN INVERTER OPERABLE WITH THE COMMERCIAL POWER SUPPLY GENERATING A.C. POWER --

Signed and Sealed this

Sixteenth Day of November, 2004

JON W. DUDAS
*Director of the United States Patent and Trademark Office*